Feb. 10, 1925. Re. 15,997
R. F. WOOD ET AL
LIFTING JACK
Original Filed Sept. 15, 1923
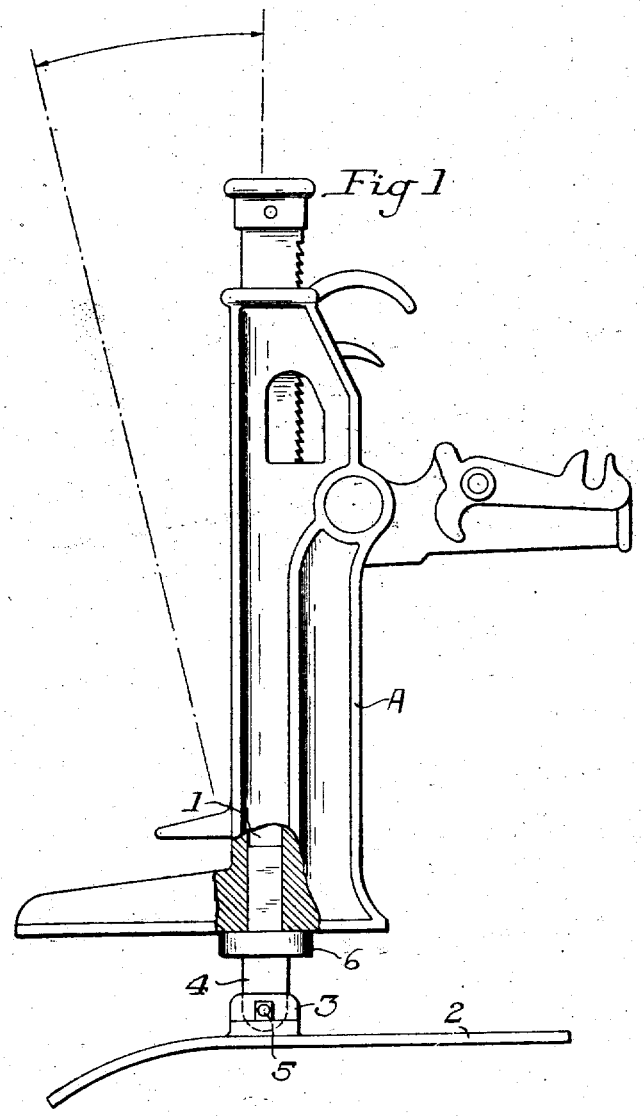
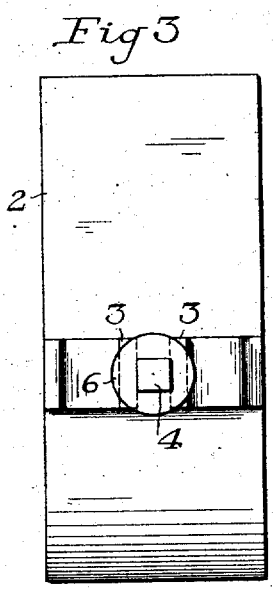
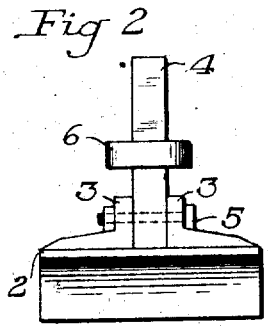
INVENTORS
Robert F. Wood
William H. McCarthy
By Byrnes, Latbrup & Parmele
their Attys Reissued Feb. 10, 1925. Re. 15,997

UNITED STATES PATENT OFFICE.

ROBERT F. WOOD AND WILLIAM H. McCARTHY, OF MAHANOY PLANE, PENNSYLVANIA.

LIFTING JACK.

Original No. 1,505,118, dated August 19, 1924, Serial No. 662,846, filed September 15, 1923. Application for reissue filed December 10, 1924. Serial No. 755,119.

*To all whom it may concern:*

Be it known that we, ROBERT F. WOOD and WILLIAM H. McCARTHY, citizens of the United States, residing at Mahanoy Plane, in the county of Schuylkill and State of Pennsylvania, have invented certain new and useful Improvements in Lifting Jacks, of which the following is a specification, reference being had to the accompanying drawings.

This invention relates to certain improvements in lifting jacks and has relation more particularly to a foot adapted to be associated therewith, said foot comprising novel and improved means whereby the line of action of the jack may be readily changed and which foot is constructed in a manner adapting it for use in connection with jacks now generally employed.

The invention consists in the details of construction and in the combination and arrangement of the several parts of our improved lifting jack whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in side elevation, illustrating a foot for a jack constructed in accordance with an embodiment of our invention and in applied position, a second position of the jack with respect to the foot being diagrammatically indicated by broken lines;

Figure 2 is an end elevational view of the foot as herein disclosed unapplied; and Figure 3 is a view in top plan of the device as illustrated in Figure 2.

As disclosed in the accompanying drawings, A denotes a lifting jack of a conventional type for use in connection with railroad tracksways and which is provided in its lower portion with an opening to provide a socket 1 for a purpose to be hereinafter more particularly referred to.

Our improved foot comprises an elongated plate 2 relatively broad, and which has one end portion disposed on a predetermined curvature. The upper face of the plate 2 inwardly of but in close proximity to the curved portion thereof is provided with a mounting permitting angular movement of the jack relatively to the base, such mounting being herein shown as comprising a pair of transversely spaced ears or wings 3 between which is disposed an end portion of a pin 4 of desired length. The portion of the pin 4 between the ears or wings 3 is pivotally connected therewith through the instrumentality of the pintle 5 whereby the plate 2 and the pin 4 are connected for relative swinging movement in a direction lengthwise of the plate 2.

The pin 4 is of a length to be inserted within the socket 1 hereinbefore referred to of the jack A, the extent of insertion of the pin 4 being limited by the annular flange or collar 6 carried by the pin 4 at a predetermined point inwardly of its outer end.

With the use of our improved foot, the line of action of the jack A may be readily and conveniently changed as required, whereby the jack is particularly adapted for use in the lining of the rails of a trackway. Furthermore, it is to be noted that our improved foot is of a character to permit its use in connection with jacks of a type now generally employed.

From the foregoing description it is thought to be obvious that a lifting jack constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. In combination with a jack provided with a socket in its lower end, a foot comprising an elongated plate having one end portion disposed on a curvature away from the jack when the foot and jack are assembled, and a pin pivotally mounted on the plate in close proximity to the curved portion thereof, said pin being insertible within the socket in the lower end portion of the jack and being provided intermediate its ends with means to limit the insertion of the pin into said socket, substantially as described.

2. The combination with a jack having a socket in its foot portion, of a foot comprising a plate having an end portion curved away from the foot of the jack, and a pin having a pivotal connection with the plate adjacent to the curved portion and insertible in the socket of the jack foot, substantially as described.

In witness whereof, we have hereunto set our hands.

ROBERT F. WOOD.
WILLIAM H. McCARTHY.